United States Patent
Takemura et al.

(10) Patent No.: US 9,503,610 B2
(45) Date of Patent: Nov. 22, 2016

(54) APPARATUS AND METHOD FOR FORMING IMAGE OBTAINED BY ADDING MIDPOINT INDICATING IMAGE TO SCAN IMAGE ON SHEET

(71) Applicant: KYOCERA Document Solutions Inc., Osaka-shi (JP)

(72) Inventors: Masataka Takemura, Osaka (JP); Kunihiko Tanaka, Osaka (JP); Hiroshi Yokota, Osaka (JP); Shinji Hayashi, Osaka (JP); Seiki Satomi, Osaka (JP); Masaki Miyashita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/750,675

(22) Filed: Jun. 25, 2015

(65) Prior Publication Data

US 2015/0381851 A1 Dec. 31, 2015

(30) Foreign Application Priority Data

Jun. 25, 2014 (JP) ................................ 2014-129890

(51) Int. Cl.
*H04N 1/387* (2006.01)
*H04N 1/32* (2006.01)
*H04N 1/38* (2006.01)

(52) U.S. Cl.
CPC ........ *H04N 1/3872* (2013.01); *H04N 1/32133* (2013.01); *H04N 1/3871* (2013.01); *H04N 1/38* (2013.01); *H04N 2201/0094* (2013.01)

(58) Field of Classification Search
CPC .................................................. H04N 1/3872

USPC .......................................................... 358/1.18
See application file for complete search history.

(56) References Cited

U.S. PATENT DOCUMENTS

| 6,549,734 B2 * | 4/2003 | Yamada ..................... B26F 1/04 270/58.07 |
| 2004/0042812 A1 * | 3/2004 | Sakuma ............. G03G 15/6582 399/82 |
| 2013/0229695 A1 * | 9/2013 | Lei ........................... H04N 1/38 358/448 |

FOREIGN PATENT DOCUMENTS

| JP | H06-238984 A | 8/1994 |
| JP | 2000-094780 A | 4/2000 |
| JP | 2001-171195 A | 6/2001 |
| JP | 2001-213016 A | 8/2001 |
| JP | 2009-269186 A | 11/2009 |

* cited by examiner

*Primary Examiner* — Jacky X Zheng
(74) *Attorney, Agent, or Firm* — Studebaker & Brackett PC

(57) ABSTRACT

An image forming apparatus includes a punch hole detection section, a position calculating section, an image adding section, and an image forming section. The punch hole detection section analyzes image data of a scan image obtained through scanning of an original document to detect two punch hole images. The position calculating section calculates a midpoint between the two punch hole images in the scan image when the two punch hole images are detected. The image adding section adds image data of a midpoint indicating image to the image data of the scan image so that the midpoint indicating image is added to the scan image at a position corresponding to the midpoint. The image forming section performs image formation on a sheet based on the image data of the scan image to which the image data of the midpoint indicating image has been added.

4 Claims, 9 Drawing Sheets

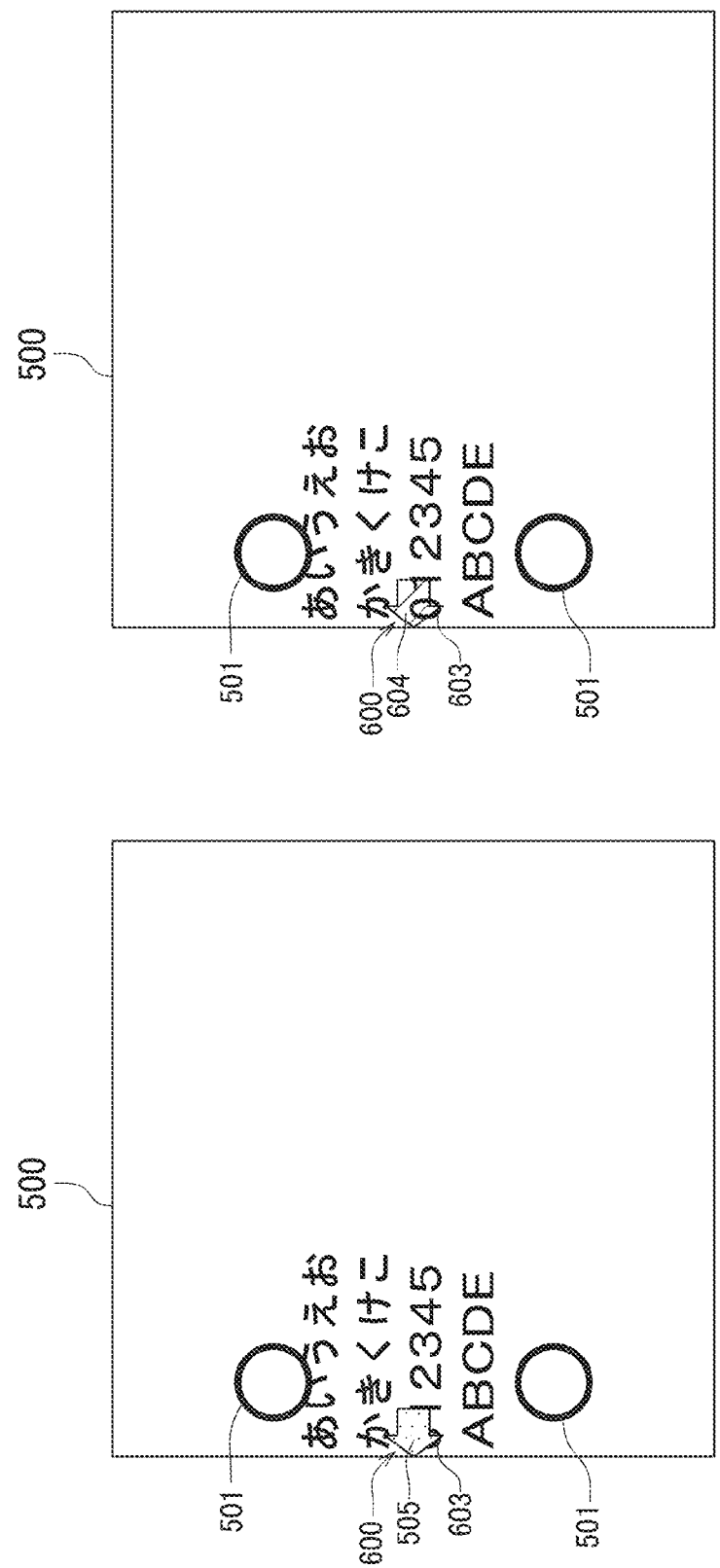

APPARATUS AND METHOD FOR FORMING IMAGE OBTAINED BY ADDING MIDPOINT INDICATING IMAGE TO SCAN IMAGE ON SHEET

INCORPORATION BY REFERENCE

The present application claims priority under 35 U.S.C. §119 to Japanese Patent Application No. 2014-129890, filed Jun. 25, 2014. The contents of this application are incorporated herein by reference in their entirety.

BACKGROUND

The present disclosure relates to an image forming apparatus and a method of forming an image.

When an image is formed on a sheet based on image data of an image of an original document having punch holes, the sheet on which the image has been formed (hereinafter, referred to as a copy) may include black circle images depicting the punch holes (hereinafter, may be referred to as punch hole images). In the case where such a copy is punched, it is desirable to punch holes at positions of the black circle images printed in the copy. However, it is difficult to punch holes accurately at the positions of the black circle images. If holes are punched at positions offset from the positions of the black circle images, the readability of the copy may be reduced. Furthermore, the punch holes may take away much information from the copy. Various techniques have been proposed in order to solve such a problem.

For example, some image forming apparatuses such as multifunction peripherals, copiers, and printers are capable of adding a reference mark to an image of an original document and printing the image including the reference mark on a sheet as a copy. The reference mark is used when a user punches holes in the copy. More specifically, the user performs punching with the reference mark aligned with a centering indicator of a punch. Thus, two holes are punched at desired positions in the copy. The centering indicator indicates a midpoint between two boring fixtures of the punch.

In some image forming apparatuses, a printing position of a reference mark in a copy can be set by a user's operation through an operation section. The reference mark and punch holes can be thereby prevented from overlapping a printed image of an original document in the copy.

SUMMARY

An image forming apparatus according to an aspect of the present disclosure includes a punch hole detection section, a position calculating section, an image adding section, and an image forming section. The punch hole detection section analyzes image data of a scan image obtained through scanning of an original document to detect two punch hole images. The position calculating section calculates a midpoint between the two punch hole images in the scan image when the two punch hole images are detected. The image adding section adds image data of a midpoint indicating image to the image data of the scan image so that the midpoint indicating image is added to the scan image at a position corresponding to the midpoint. The image forming section performs image formation on a sheet based on the image data of the scan image to which the image data of the midpoint indicating image has been added.

An image forming method according to an aspect of the present disclosure comprises: analyzing image data of a scan image obtained through scanning of an original document to detect two punch hole images; calculating a midpoint between the two punch hole images in the scan image when the two punch hole images are detected; adding image data of a midpoint indicating image to the image data of the scan image so that the midpoint indicating image is added to the scan image at a position corresponding to the midpoint; and performing image formation on a sheet based on the image data of the scan image to which the image data of the midpoint indicating image has been added.

BRIEF DESCRIPTION OF THE DRAWINGS

FIG. 6B is a diagram illustrating a situation in which a midpoint indicating image has been added to an image of non-black text according to the embodiment of the present disclosure.

DETAILED DESCRIPTION

Hereinafter, an embodiment of the present disclosure will be described with reference to the accompanying drawings to facilitate understanding of the present disclosure. The following embodiment is provided as a specific example of the present disclosure and does not in any way limit the technical scope of the present disclosure. Note that the letter S appearing before numbers in the flowchart is used as an abbreviation for "step".

Hereinafter, an example of the embodiment of the present disclosure will be described. An image forming apparatus of the present disclosure is for example a multifunction peripheral (MFP) implementing functions of a copier, a scanner, a printer, and so on.

Figure 1:
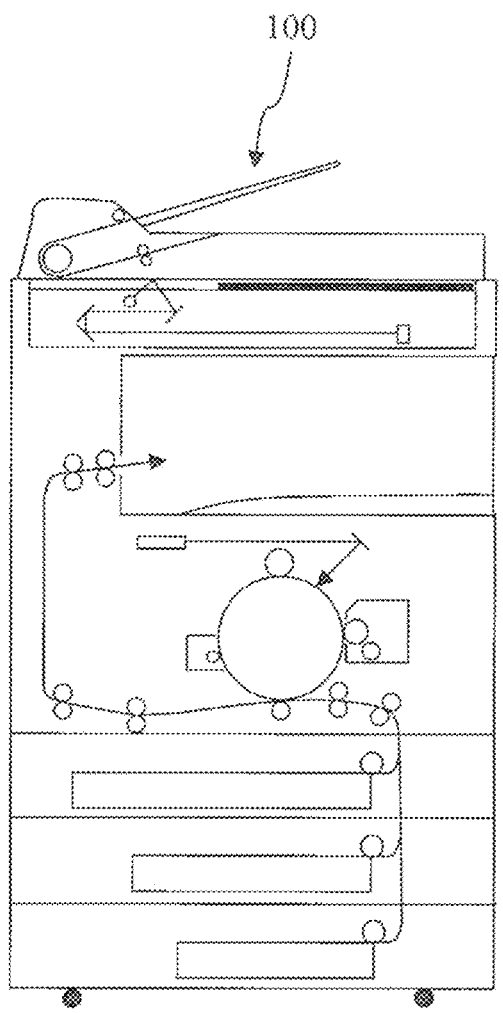
FIG. 1 is a schematic diagram illustrating general configuration of a multifunction peripheral according to an embodiment of the present disclosure.

As illustrated in FIG. 1, a multifunction peripheral 100 receives settings for a printing job from a user through an operation section. According to the settings, the multifunction peripheral 100 drives various sections thereof (such as an image scanning section, an image forming section, a sheet conveyance section, and a fixing section) to execute the printing job.

The image scanning section scans an image of an original document on a document table to generate image data of a scan image. Hereinafter, an image of an original document will be referred to as an original document image. The sheet conveyance section conveys a sheet of a type in accordance with the settings. The image forming section transfers, onto the sheet, a toner image corresponding to the scan image. The fixing section fixes the toner image on the sheet. The sheet on which the toner image has been fixed is ejected.

Figure 2:
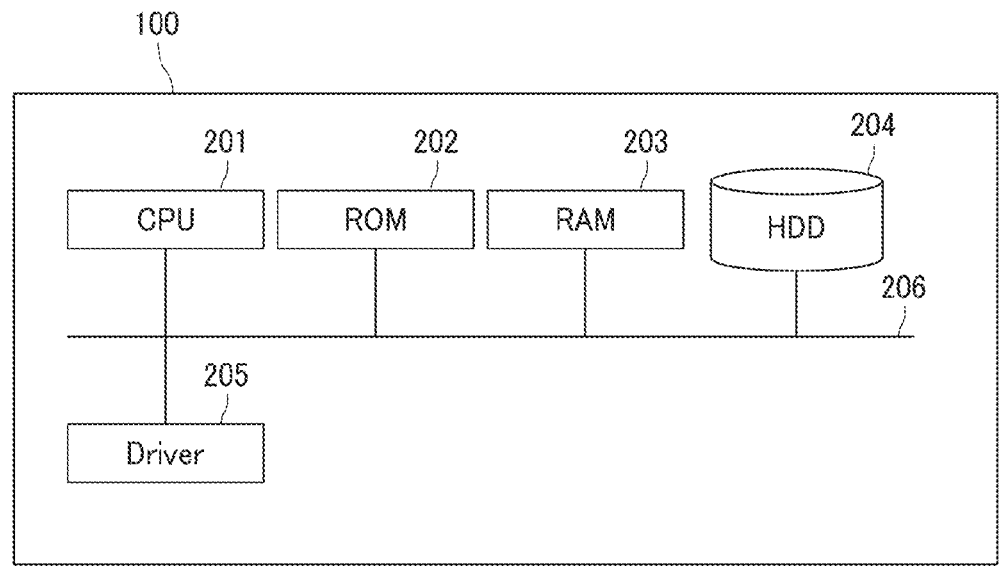
FIG. 2 is a diagram illustrating configuration of control system hardware of the multifunction peripheral according to the embodiment of the present disclosure.

As illustrated in FIG. 2, a control circuit of the multifunction peripheral 100 has a central processing unit (CPU) 201, read only memory (ROM) 202, random access memory (RAM) 203, a hard disk drive (HDD) 204, and a driver 205 for each section.

The CPU 201, the ROM 202, the RAM 203, the HDD 204, and the drivers 205 are connected through an internal bus 206.

The CPU 201 of the multifunction peripheral 100 uses for example the RAM 203 as a work area for executing a program stored in the ROM 202, the RAM 203, or the HDD 204. Through execution of the program, the CPU 201 performs transmission and reception with each section of instructions, signals, commands, or the like via the driver 205. As a result, the operation of each section shown in FIG. 1 is controlled.

Figure 3:
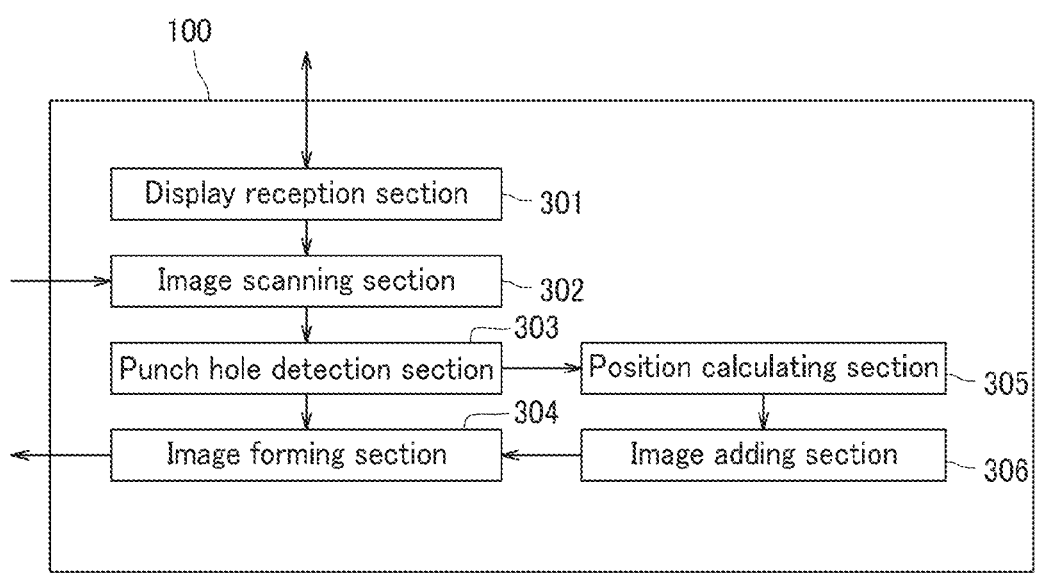
FIG. 3 is a functional block diagram of the multifunction peripheral according to the embodiment of the present disclosure.

Next, configuration and a procedure for performing the embodiment of the present disclosure will be described with reference to FIGS. 3, 4, and 5. As illustrated in FIG. 3, the multifunction peripheral 100 includes a display reception section 301, an image scanning section 302, a punch hole detection section 303, an image forming section 304, a position calculating section 305, and an image adding section 306. The display reception section 301, the punch hole detection section 303, the position calculating section 305, and the image adding section 306 are implemented through execution of a program by the CPU 201. A program and data for implementing each section are stored in the ROM 202, the RAM 203, the HDD 204, or the like.

First, upon a user turning on the power of the multifunction peripheral 100, the display reception section 301 of the multifunction peripheral 100 causes display of an operation screen on a touch panel of the operation section.

The user places an original document having punch holes on the document table. The user then inputs desired settings through the operation screen and selects a start key. Thus, the display reception section 301 receives a printing job according to the settings input by the user (S101, FIG. 4).

Upon receiving the printing job, the display reception section 301 notifies the image scanning section 302 accordingly. Upon receiving the notification, the image scanning section 302 scans an original document image (S102, FIG. 4). Once the scanning is complete, the image scanning section 302 notifies the punch hole detection section 303 accordingly. Upon receiving the notification, the punch hole detection section 303 analyzes image data of the scan image and performs detection of two punch hole images (S103, FIG. 4).

The method of detecting two punch hole images by the punch hole detection section 303 is not particularly limited. For example, the punch hole detection section 303 detects, as the punch hole images, images of predetermined circular forms (hereinafter, referred to as circular images) each corresponding to a punch hole. More specifically, the punch hole detection section 303 detects the two circular images in the vicinity of one of four edges of the scan image.

When two punch hole images are not detected as a result of the detection by the punch hole detection section 303, that is, when the original document does not have two punch holes (No in S103, FIG. 4), the punch hole detection section 303 notifies the image forming section 304 accordingly. Upon receiving the notification, the image forming section 304 performs image formation on a sheet based on image data of the scan image. That is, the printing job is executed (S104, FIG. 4). In such a situation (No in S103, FIG. 4), the user can obtain a copy having the same image printed thereon as that of the original document placed on the document table.

On the other hand, when two punch hole images are detected as a result of the detection by the punch hole detection section 303 in S103, that is, when the original document has two punch holes (Yes in S103, FIG. 4), the punch hole detection section 303 notifies the position calculating section 305 accordingly. Upon receiving the notification, the position calculating section 305 calculates a midpoint between the two punch hole images (hereinafter, referred to as an inter-punch hole midpoint) based on the positions of the two punch hole images that have been detected.

Figure 5A:
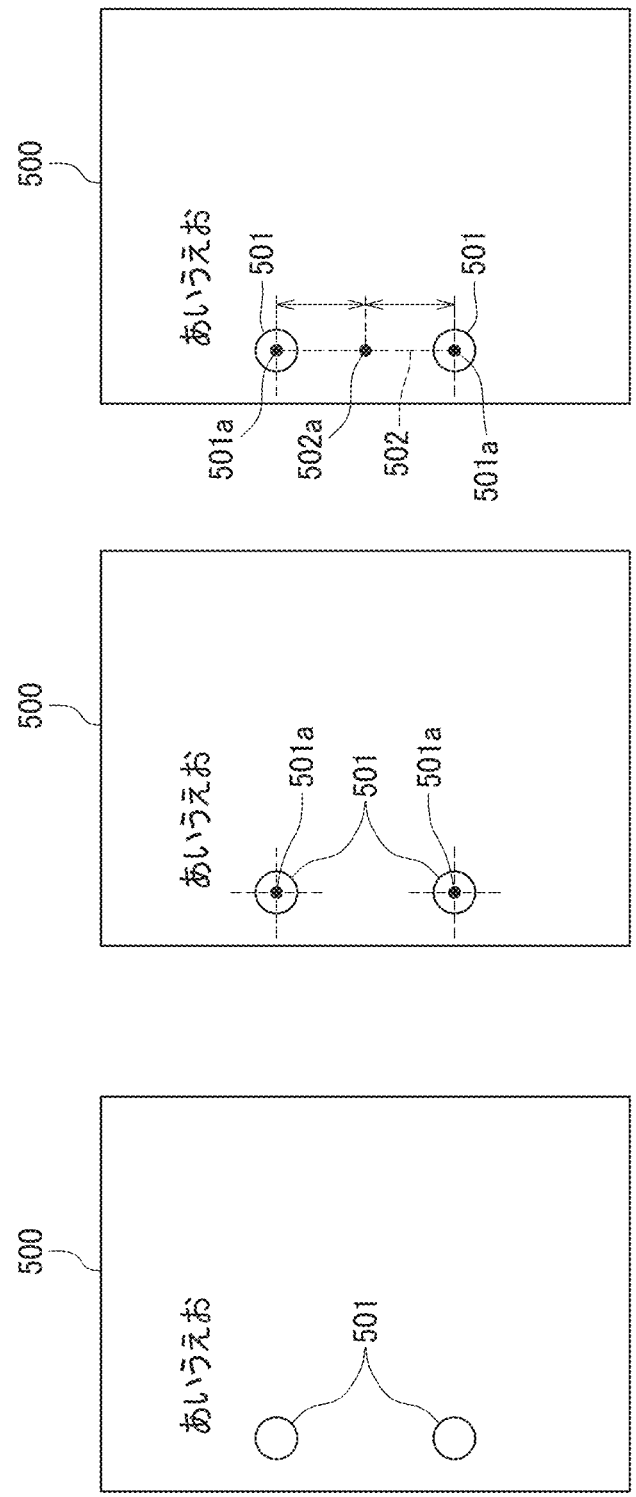
FIG. 5A is a diagram illustrating how to calculate a midpoint between punch holes by a position calculating section according to the embodiment of the present disclosure.

The method of calculating the midpoint between punch holes by the position calculating section 305 is not particularly limited. For example, as illustrated in FIG. 5A, the position calculating section 305 first analyzes image data of a scan image 500 to specify two punch hole images 501 in the scan image 500. In order to facilitate understanding, the punch hole images 501 are represented by white circles in FIGS. 5A, 5B, and 5C.

The position calculating section 305 then calculates a center position 501a of each of the two punch hole images 501 specified (hereinafter, referred to as a punch hole center position 501a) (S105, FIG. 4). Next, the position calculating section 305 calculates a midpoint between the two punch hole center positions 501a as an inter-punch hole midpoint 502a. In other words, the position calculating section 305 calculates a midpoint of a line segment 502 between the two punch hole center positions 501a as the inter-punch hole midpoint 502a (S106, FIG. 4).

Figure 5B:
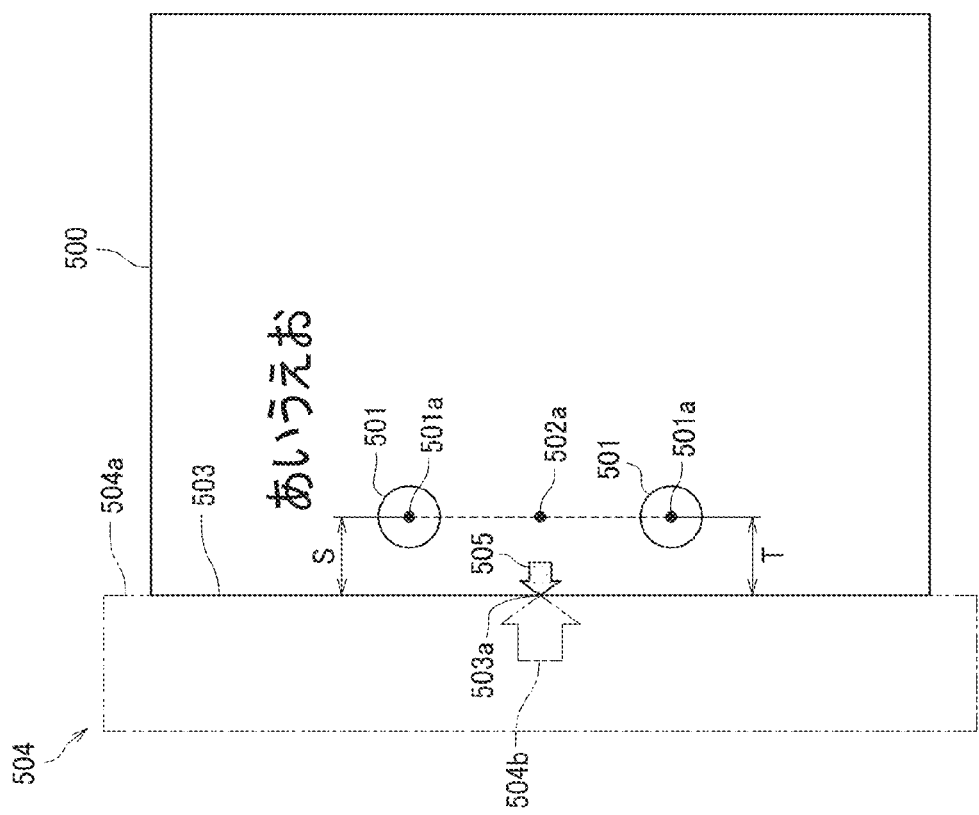
FIG. 5B is a diagram illustrating an example of a scan image to which a midpoint indicating image has been added according to the embodiment of the present disclosure.

Upon completion of calculating the inter-punch hole midpoint 502a, the position calculating section 305 notifies the image adding section 306 accordingly. Upon receiving the notification, the image adding section 306 adds image data of a first midpoint indicating image 505 to the image data of the scan image 500 as illustrated in FIG. 5B.

The user performs punching on the copy with the first midpoint indicating image 505 printed on the copy aligned opposite to a centering indicator 504b of a punch 504. Thus, the user can punch two holes in the image formed in the copy at the same positions as the positions of the two punch hole images 501 in the scan image 500. The centering indicator 504b for example indicates a midpoint of a long side of a guide 504a of the punch 504.

The method of adding the image data of the first midpoint indicating image 505 to the image data of the scan image 500 by the image adding section 306 is not particularly limited. For example, as illustrated in FIG. 5B, the image adding section 306 detects an edge 503 of the scan image 500 that is closest to the inter-punch hole midpoint 502a obtained through the calculation. The image adding section 306 then calculates an actual distance T between the edge 503 that has been detected and the inter-punch hole midpoint 502a. The image adding section 306 then determines whether or not the actual distance T is equal to a prescribed distance S (S107, FIG. 4).

The prescribed distance S is prestored in the ROM 202, the RAM 203, or the HDD 204. The prescribed distance S is a distance between the guide 504a and a midpoint between two punch holes where the punch holes are made with an edge of the original document precisely abutting the guide 504a of the punch 504. The edge of the scan image 500 corresponds to the edge of the original document. In order to facilitate understanding, therefore, the prescribed distance S is illustrated on the assumption that the edge of the scan image 500 is the edge of the original document in FIGS. 5B and 5C.

Figure 4:
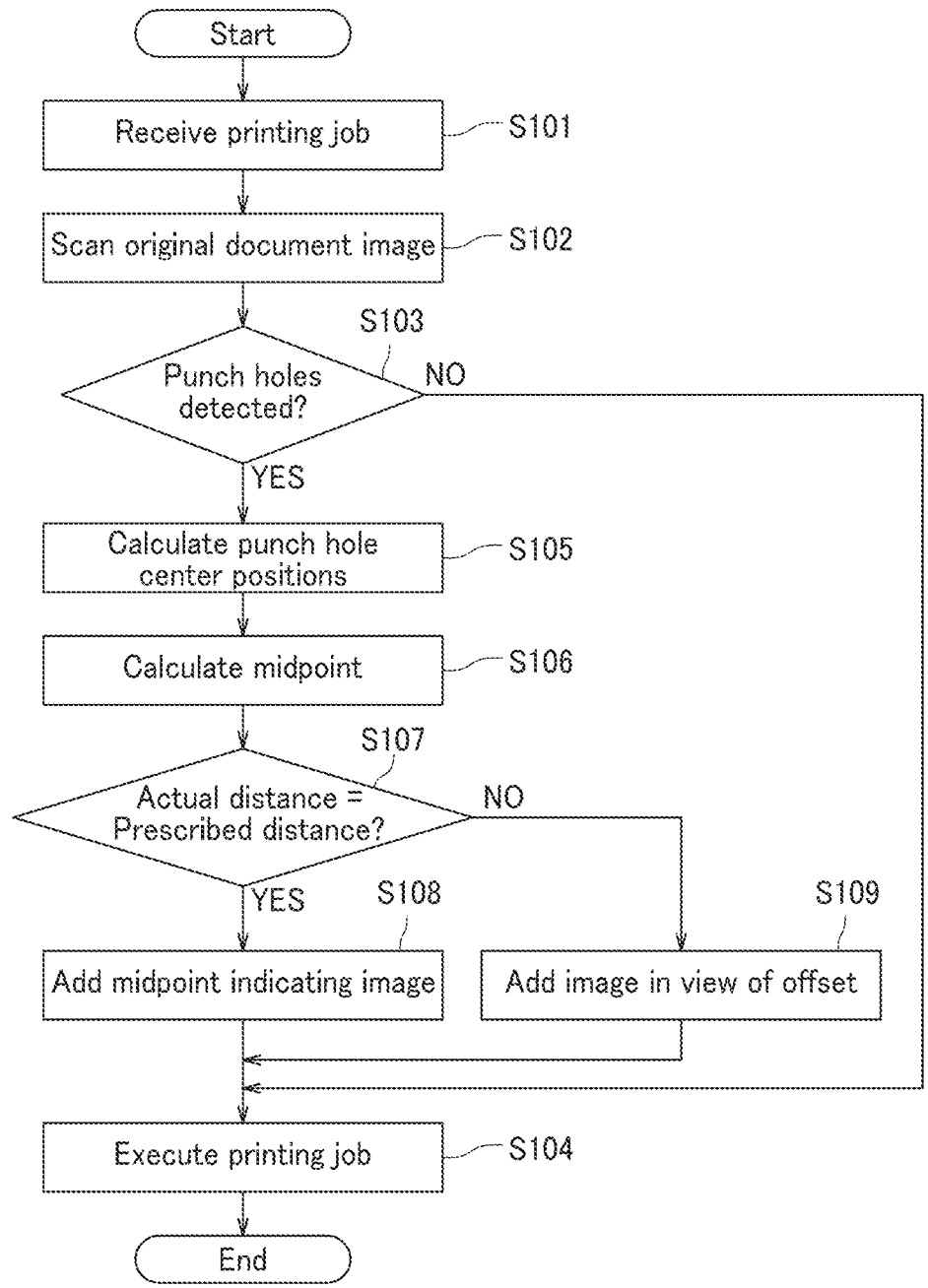
FIG. 4 is a flowchart illustrating a procedure for performing the embodiment of the present disclosure.

When a result of determination by the image adding section 306 is that the actual distance T is equal to the prescribed distance S (Yes in S107, FIG. 4), the image adding section 306 adds the image data of the first midpoint indicating image 505 to the image data of the scan image 500 so that an end of the first midpoint indicating image 505 coincides with a proximate point 503a as illustrated in FIG. 5B (S108, FIG. 4). The proximate point 503a is a point on the edge 503 of the scan image 500 that is proximate to the inter-punch hole midpoint 502a. The first midpoint indicating image 505 is an image indicating that punching is to be performed with the edge of the copy abutting the guide 504a. For example, the first midpoint indicating image 505 may be an arrow image indicating the proximate position 503a.

Once addition of the image data of the first midpoint indicating image 505 to the image data of the scan image 500 is complete, the image adding section 306 notifies the image forming section 304 accordingly. Upon receiving the notification, the image forming section 304 performs image formation on a sheet based on the image data obtained by adding the image data of the first midpoint indicating image 505 to the image data of the scan image 500. That is, the printing job is executed (S104, FIG. 4).

Thus, the user can obtain a copy in which an image including the scan image 500 and the first midpoint indicating image 505 added thereto has been formed. Using the punch 504, which is a commercially available punch, the user performs punching on the copy with the first midpoint indicating image 505 in the copy aligned with the centering indicator 504b of the punch 504. Thus, it is possible to punch holes at the positions of the two punch hole images 501 present in the scan image 500. That is, it is possible to punch holes in the image formed in the copy at positions corresponding to the positions of the two punch holes in the original document. Therefore, the possibility of losing information on the copy because of the punch holes is reduced. Since the holes are punched at the positions of the punch hole images, that is, black circle images, the black circle images are removed from the copy. The copy that has undergone the punching therefore has a good appearance.

According to the present embodiment, the position calculating section 305 calculates the inter-punch hole midpoint 502a to determine a location at which the first midpoint indicating image 505 is to be formed. Accordingly, the user does not need to set through the operation section the location at which the first midpoint indicating image 505 is to be printed.

Figure 5C:
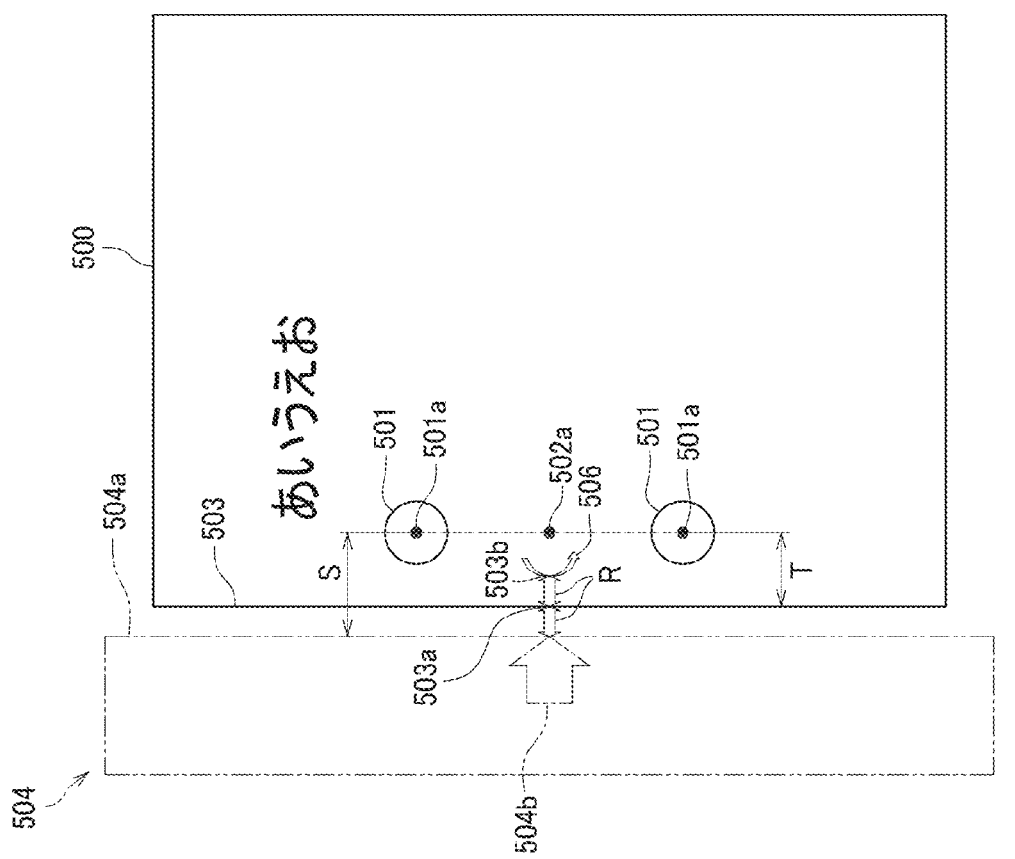
FIG. 5C is a diagram illustrating an example of a scan image to which another type of midpoint indicating image has been added according to the embodiment of the present disclosure.

On the other hand, when a result of the determination by the image adding section 306 is that the actual distance T is different from the prescribed distance S (No in S107, FIG. 4), image data of a second midpoint indicating image 506 is added to the image data of the scan image 500 in the present embodiment. The second midpoint indicating image 506 indicates a distance by which the copy is to be separated from the guide 504a. More specifically, as illustrated in FIG. 5C, the image adding section 306 calculates a subtraction value R (offset) obtained through subtraction of the actual distance T from the prescribed distance S. The image adding section 306 then adds the image data of the second midpoint indicating image 506 that indicates the subtraction value R as the distance by which the copy is to be separated from the guide 504a to the image data of the scan image 500 (S109, FIG. 4). For example, the image adding section 306 adds a circular arrow as the second midpoint indicating image 506 as illustrated in FIG. 5C. In such a situation, the image adding section 306 specifies an offset position 503b that is offset toward the inter-punch hole midpoint 502a by the subtraction value R from the proximate position 503a. The image adding section 306 adds the image of the second midpoint indicating image 506 to the image data of the scan image 500 so that a section of the circular arrow that is closest to the proximate position 503a coincides with the offset position 503b.

The image forming section 304 performs image formation on a sheet based on the image data obtained by adding the image data of the second midpoint indicating image 506 to the image data of the scan image 500. That is, the printing job is executed (S104, FIG. 4).

The user can punch holes at the positions of the two punch hole images 501 present in the scan image 500 by performing punching in accordance with the second midpoint indicating image 506 printed in the copy even when a distance between the center of each punch hole in the original document and the edge of the original document is shorter than the prescribed distance S for some reason. More specifically, the user performs punching with the edge of the copy separated from the guide 504a of the punch 504 by the subtraction value R indicated by the second midpoint indicating image 506. Thus, it is possible to punch holes at the positions of the two punch hole images 501 present in the scan image 500. Accordingly, the possibility of losing information on the copy because of the punch holes is reduced.

The present embodiment is described using as an example a configuration in which the first midpoint indicating image 505 or the second midpoint indicating image 506 is added based on the actual distance T, the prescribed distance S, and the subtraction value R. However, the present disclosure is not limited to the embodiment. For example, an X direction and a Y direction that is perpendicular to the X direction may be defined with respect to the scan image 500, and the image data of the first midpoint indicating image 505 or the second midpoint indicating image 506 may be added to the image data of the scan image 500 based on an XY coordinate system on the scan image 500.

Figure 6A:
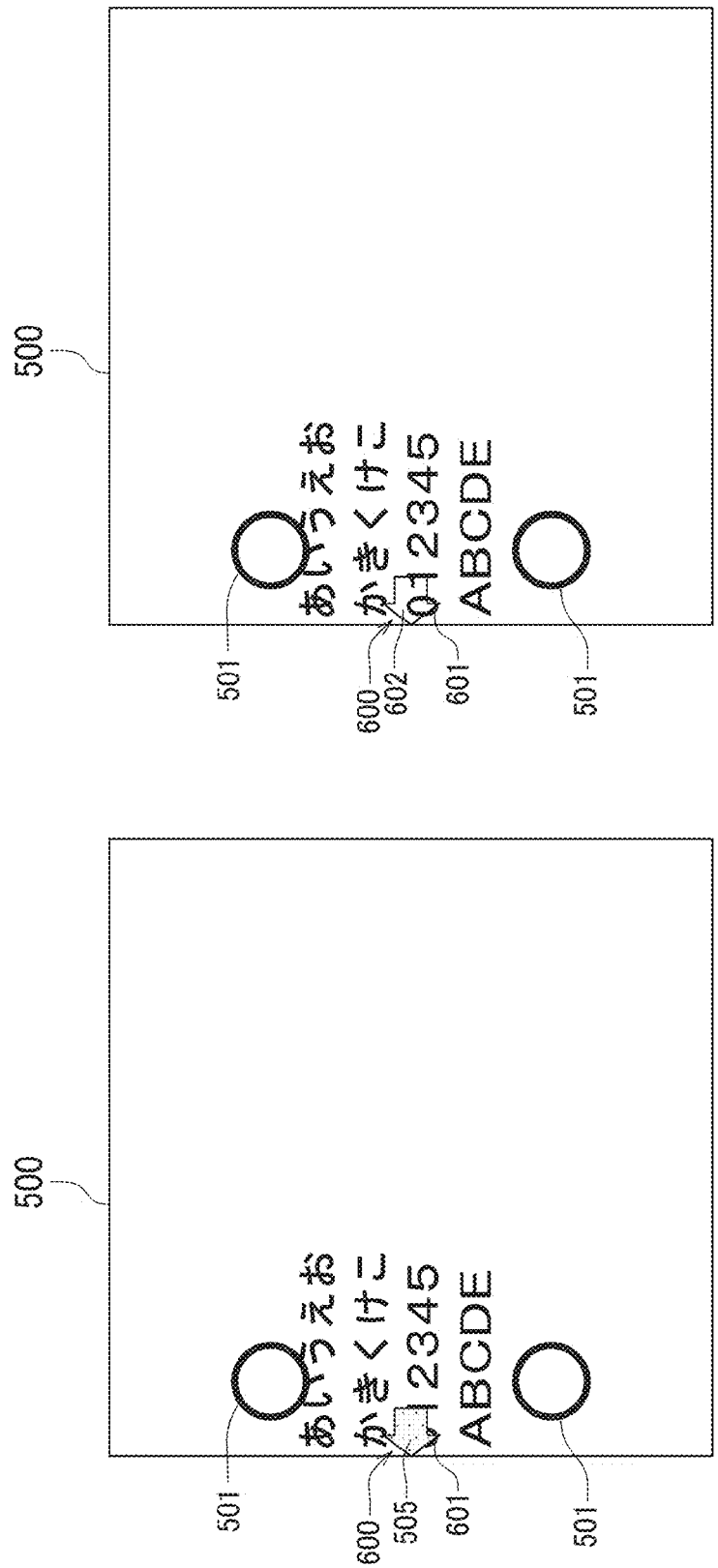
FIG. 6A is a diagram illustrating a situation in which a midpoint indicating image has been added to an image of monochrome text according to the embodiment of the present disclosure.

In a situation in which a given image (e.g., text or graphic) is present in the scan image 500 at a position to which the first midpoint indicating image 505 or the second midpoint indicating image 506 is added, the multifunction peripheral 100 of the present embodiment performs image processing as follows. In a situation in which an image of monochrome text 601 is present at a position 600 to which the first midpoint indicating image 505 is added as illustrated in FIG. 6A, the image adding section 306 adds a third midpoint indicating image 602 obtained by reducing an image density of the first midpoint indicating image 505 to a level lower than the image density of the monochrome text 601. As a result, the monochrome text 601 and the third midpoint indicating image 602 can be easily distinguished.

As illustrated in FIG. 6B, in a situation in which an image of non-black (red) text 603 is present at the position 600 to which the first midpoint indicating image 505 is added, the image adding section 306 adds a fourth midpoint indicating image 604 obtained by giving the first midpoint indicating image 505 a color (blue-green) complementary to the color (red) of the non-black text 603. As a result, the non-black text 603 and the fourth midpoint indicating image 604 can be easily distinguished.

Figure 6C:
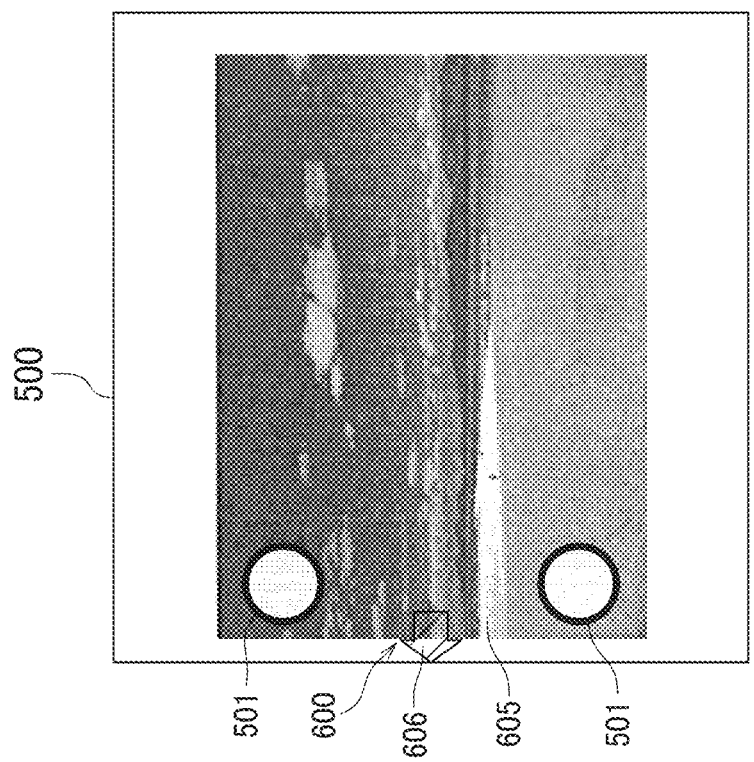
FIG. 6C is a diagram illustrating a situation in which a midpoint indicating image has been added to an image of a color photograph according to the embodiment of the present disclosure.
Figure 6C:
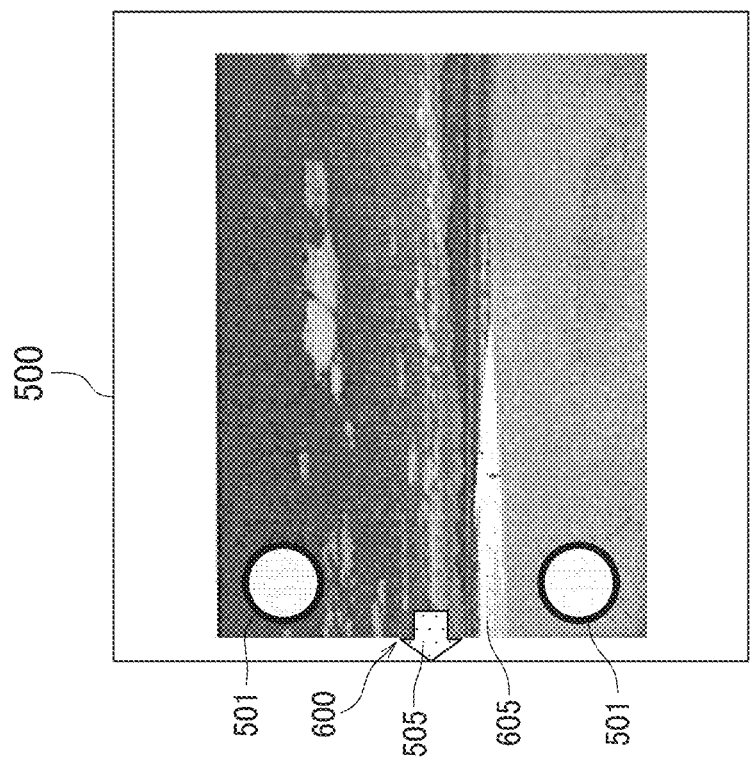

In a situation in which a color photograph image 605 is present at the position 600 to which the first midpoint indicating image 505 is added as illustrated in FIG. 6C, the image adding section 306 adds a fifth midpoint indicating image 606 obtained by reducing the image density of the first midpoint indicating image 505 to a level lower than the image density of the color photograph image 605 and giving the first midpoint indicating image 505 a color complementary to the color of the color photograph image 605. As a result, the color photograph image 605 and the fifth midpoint indicating image 606 can be easily distinguished.

The embodiment of the present disclosure is described for a configuration in which the multifunction peripheral 100 includes each of the sections described above. However, the present disclosure is not limited to the embodiment. For example, according to the present disclosure, the sections may be implemented through a program for implementing the sections that is installed from a storage medium and executed by the CPU 201. In this case, the program itself that is read out of the storage medium produces the effect of the present disclosure. Alternatively, the CPU 201 may directly execute the program for implementing the sections in the storage medium to implement the sections.

What is claimed is:

1. An image forming apparatus comprising:
   an image forming section including a photosensitive drum and configured to perform image formation on a sheet; and
   a processor configured to perform:
      analyzing image data of a scan image obtained through scanning of an image of an original document having two punch holes formed therein to detect two punch hole images representing the respective two punch holes in the original document;
      calculating a midpoint between the two punch hole images in the scan image; and
      adding image data of a midpoint indicating image to the image data of the scan image so that the midpoint indicating image is added to the scan image at a position corresponding to the midpoint, wherein
   the image forming section performs image formation on the sheet based on the image data of the scan image to which the image data of the midpoint indicating image has been added,
   in the adding image data of a midpoint indicating image, the processor performs:
      detecting an edge of the scan image;
      calculating an actual distance between the detected edge of the scan image and the midpoint; and
      adding, to the image data of the scan image, image data of a first midpoint indicating image as the midpoint indicating image so that an end of the first midpoint indicating image coincides with a proximate point on the detected edge of the scan image, when the actual distance is equal to a prescribed distance,
   the proximate point is a point proximate to the midpoint,
   the prescribed distance is a distance between a guide of a punch and a midpoint between punch holes where the punch holes are made through punching with an edge of the original document abutting the guide of the punch, and
   the first midpoint indicating image indicates that punching is to be performed with an edge of the sheet abutting the guide.

2. The image forming apparatus according to claim 1, wherein
   in the adding image data of a midpoint indicating image, the processor performs adding, to the image data of the scan image, image data of a second midpoint indicating image as the midpoint indicating image when the actual distance is different from the prescribed distance, and
   the second midpoint indicating image indicates a distance by which the sheet is to be separated from the guide of the punch.

3. The image forming apparatus according to claim 2, wherein
   the second midpoint indicating image indicates a subtraction value obtained through subtraction of the actual distance from the prescribed distance as the distance by which the sheet is to be separated from the guide of the punch.

4. An image forming method comprising:
   analyzing image data of a scan image obtained through scanning of an image of an original document having two punch holes formed therein to detect two punch hole images representing the respective two punch holes;
   calculating a midpoint between the two punch hole images in the scan image;
   adding image data of a midpoint indicating image to the image data of the scan image so that the midpoint indicating image is added to the scan image at a position corresponding to the midpoint; and
   performing image formation on a sheet based on the image data of the scan image to which the image data of the midpoint indicating image has been added, wherein
   the adding image data of a midpoint indicating image includes:
      detecting an edge of the scan image;
      calculating an actual distance between the detected edge of the scan image and the midpoint; and
      adding, to the image data of the scan image, image data of the midpoint indicating image so that an end of the midpoint indicating image coincides with a proximate point on the detected edge of the scan image, when the actual distance is equal to a prescribed distance,
   the proximate point is a point proximate to the midpoint, and
   the prescribed distance is a distance between a guide of a punch and a midpoint between punch holes where the punch holes are made through punching with an edge of the original document abutting the guide of the punch.

* * * * *